United States Patent
Ionescu et al.

(10) Patent No.: US 11,023,590 B2
(45) Date of Patent: Jun. 1, 2021

(54) SECURITY TESTING TOOL USING CROWD-SOURCED DATA

(71) Applicant: International Business Machines Corporation, Armonk, NY (US)

(72) Inventors: Paul Ionescu, Ottawa (CA); Omer Tripp, Bronx, NY (US); Iosif Onut, Ottawa (CA)

(73) Assignee: International Business Machines Corporation, Armonk, NY (US)

( * ) Notice: Subject to any disclaimer, the term of this patent is extended or adjusted under 35 U.S.C. 154(b) by 293 days.

(21) Appl. No.: 16/202,393

(22) Filed: Nov. 28, 2018

(65) Prior Publication Data

US 2020/0167477 A1 May 28, 2020

(51) Int. Cl.
*H04L 29/06* (2006.01)
*G06F 21/57* (2013.01)
*G06F 16/907* (2019.01)
*G06F 16/2457* (2019.01)

(52) U.S. Cl.
CPC ...... *G06F 21/577* (2013.01); *G06F 16/24573* (2019.01); *G06F 16/24578* (2019.01); *G06F 16/907* (2019.01); *G06F 2221/033* (2013.01)

(58) Field of Classification Search
CPC ............. G06F 21/577; G06F 16/24573; G06F 16/907; H04L 63/145; H04L 63/1433
USPC ......................................................... 726/25
See application file for complete search history.

(56) References Cited

U.S. PATENT DOCUMENTS

| | | | |
|---|---|---|---|
| 8,181,245 B2 * | 5/2012 | Tripathi | H04L 63/1408 726/22 |
| 8,776,243 B2 * | 7/2014 | Nadgouda | H04L 63/164 726/25 |
| 8,949,985 B2 * | 2/2015 | Amit | H04L 63/1433 726/22 |
| 9,135,153 B2 | 9/2015 | Beskrovny et al. | |
| 9,436,829 B2 | 9/2016 | Tripp et al. | |
| 2013/0174262 A1 | 7/2013 | Amit et al. | |
| 2015/0178183 A1 | 6/2015 | Tripp et al. | |

FOREIGN PATENT DOCUMENTS

EP 2618538 A1 7/2013

OTHER PUBLICATIONS

Behrens et al., "Announcing Sleepy Puppy—Cross-Site Scripting Payload Management for Web Application Security Testing," Blog Post, Aug. 30, 2015, 7 pages. www.techblog.netflix.com.
Tripp et al., "Hybrid Security Analysis of Web JavaScript Code via Dynamic Partial Evaluation," ISSTA 2014 Proceedings of the 2014 International Symposium on Software Testing and Analysis, San Jose, California, Jul. 21-25, 2014, pp. 49-59.

* cited by examiner

*Primary Examiner* — Longbit Chai
(74) *Attorney, Agent, or Firm* — Yee & Associates, P.C.

(57) ABSTRACT

A method, apparatus, system, and computer program product for performing security testing. Information about successful payloads in payloads is determined by a computer system using crowd-sourced data in which a successful payload is a payload used in a successful attack. A set of popular payloads is determined by a computer system from the payloads using information about the successful payloads determined using the crowd-sourced data. Testing is focused by the computer system on the set of popular payloads based on a set of key features for the set of popular payloads.

14 Claims, 5 Drawing Sheets

SECURITY TESTING TOOL USING CROWD-SOURCED DATA

BACKGROUND

1. Field

The disclosure relates generally to computer systems and more specifically to a method, apparatus, system, and computer program product for focusing testing of payloads performed by a security testing tool.

2. Description of the Related Art

Attacks using payloads are common over the Internet. A payload is the part of transmitted data that is the actual intended message. Other components, such as a header and metadata, are sent with the payload to enable delivery of the payload. When payloads are used maliciously, the payload is the portion of the malware that performs a malicious action. A payload can be run in a number of different ways. For example, opening an infected file such as a JavaScript object in in a document can lead to security vulnerabilities. Further, different applications can be vulnerable to different payloads. For example, a payload may be unsuccessful in attacking a web application while the same payload may be successful in attacking an applet.

Security testing tools are present for testing potentially malicious payloads to determine whether a particular software application is vulnerable to selected payloads. With the large number of payloads, testing every potentially malicious payload can use more computer processing resources than desired. For example, the speed at which a browser that receives and renders web documents and other content on a graphical user interface can be slower than desired depending on the number of payloads being tested by a security testing tool using some or all of the same computer resources.

Therefore, it would be desirable to have a method and apparatus that take into account at least some of the issues discussed above, as well as other possible issues. For example, it would be desirable to have a method and apparatus that overcome a technical problem with testing payloads to determine which applications are vulnerable to payloads in a manner that reduces the amount of resources needed for testing.

SUMMARY

According to one embodiment of the present invention, a method is present for performing security testing. Information about successful payloads in payloads is determined by a computer system using crowd-sourced data in which a successful payload is a payload used in a successful attack. A set of popular payloads is determined by the computer system from the payloads using information about the successful payloads determined using the crowd-sourced data. Testing is focused by the computer system on the set of popular payloads based on a set of key features of the set of popular payloads.

According to another embodiment of the present invention, a security system comprises a computer system and a security testing tool running in the computer system. The security testing tool determines information about successful payloads in payloads using crowd-sourced data in which a successful payload is a payload used in a successful attack and determines a set of popular payloads from the payloads using information about the successful payloads determined from the crowd-sourced data. The security testing tool focuses testing on the set of popular payloads based on a set of key features of the set of popular payloads.

According to yet another embodiment of the present invention, a computer program product for performing security testing comprises a computer-readable-storage media, first program code, second program code, and third program code stored on the computer-readable storage media. The first program code is run to determine information about successful payloads in payloads using crowd-sourced data in which a successful payload is a payload used in a successful attack. The second program code is run to determine a set of popular payloads from the payloads using information about the successful payloads determined using the crowd-sourced data. The third program code is run to focus testing on the set of popular payloads based on a set of key features of the set of popular payloads.

DETAILED DESCRIPTION

Figure 1:
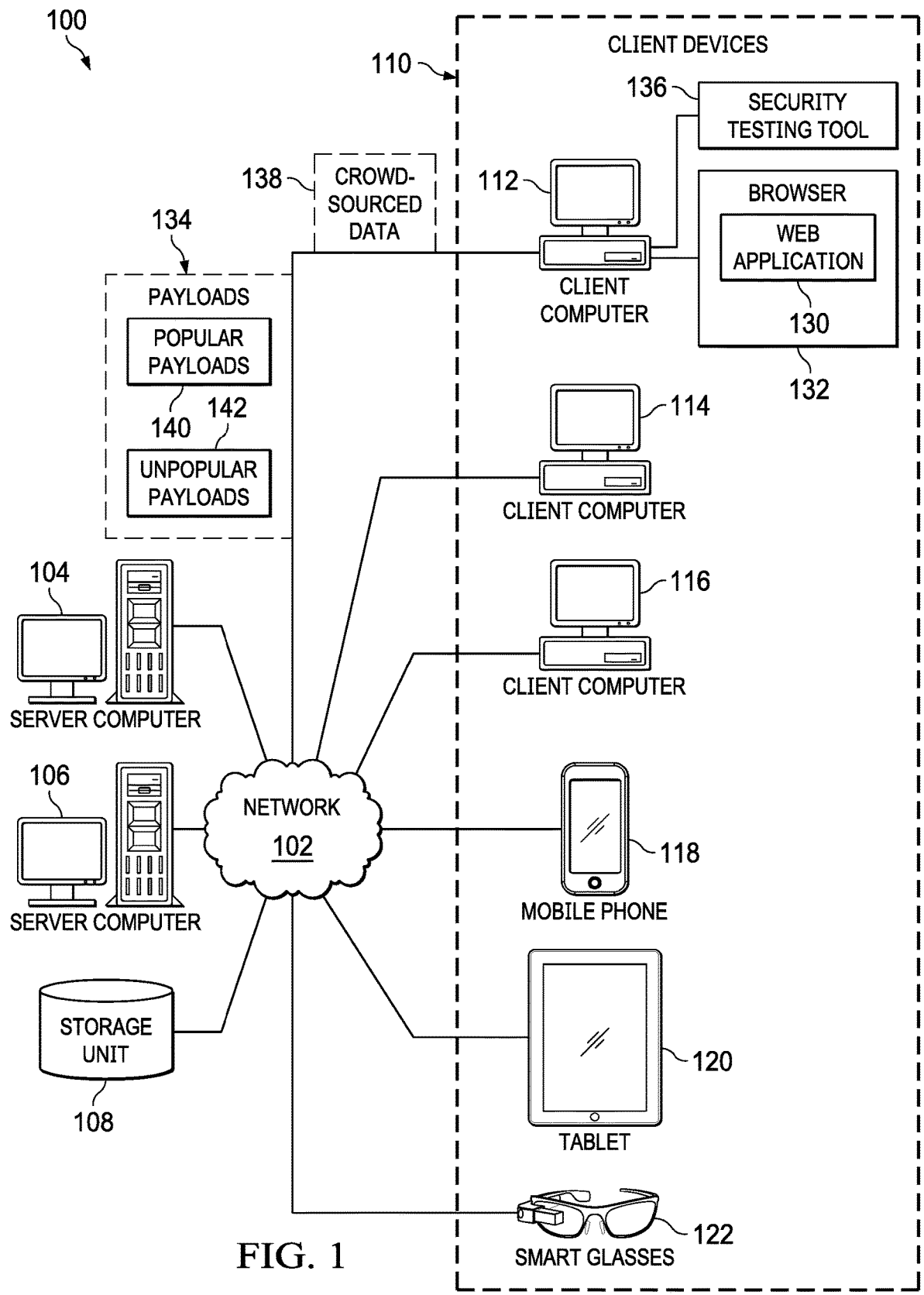
FIG. 1 is a pictorial representation of a network of data processing systems in which illustrative embodiments may be implemented.

The present invention may be a system, a method, and/or a computer program product at any possible technical detail level of integration. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer-readable program instructions may run entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may process the computer-readable program instructions by utilizing state information of the computer-readable program instructions to personalize the electronic circuitry, in order to perform aspects of the present invention.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer-readable program instructions.

These computer program instructions may be provided to a processor of a general-purpose computer, special purpose computer, or other programmable data processing apparatus to produce a machine, such that the instructions, which are run via the processor of the computer or other programmable data processing apparatus, create means for implementing the functions/acts specified in the flowchart and/or block diagram block or blocks. These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer implemented process, such that the instructions which run on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be processed substantially concurrently, or the blocks may sometimes be processed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The illustrative embodiments recognize and take account one or more different considerations. For example, the illustrative embodiments recognize and take into account that at different points in time different technologies, frameworks, backend systems, and applications are used. With these changes over time, different attack patterns can become more effective while other type become less effective.

For example, the illustrative embodiments recognize and take into account that as the client-side frameworks for websites become increasingly richer, these client-side frameworks have become more popular with users and have become targets of attacks using payloads.

For example, the illustrative embodiments recognize and take account that many web applications utilize JavaScript frameworks. The illustrative embodiments recognize and take into account that a web application is software that is accessed over a network connection using hypertext transport protocol (HTTP) rather than existing in the memory of the device in which the web application is run and that web applications often run inside of a web browser. The illustrative embodiments recognize and take into account that the hypertext markup language (HTML) page is vulnerable to document object model (DOM)-based cross scripting (XSS) attacks if an attacker can inject HTML markup into the values of parameters rendered by the client-side JavaScript code. The illustrative embodiments also recognize and take into account that these types web applications can be vulnerable to a payload such as "<iframe src=javascript:alert (1)></iframe>" more so than other DOM based XSS attack patterns.

The illustrative embodiments recognize and take account that with this situation, a security testing tool that is capable of ranking this payload higher than other XSS payloads can provide a more efficient utilization of computer resources.

The illustrative embodiments recognize and take account that this strategy would not have been effective at a prior time such as three years ago.

Thus, the illustrative embodiments recognize and take into account that the detection of client-side vulnerabilities can be challenging for both static security testing tools and dynamic security testing tools. The illustrative embodiments recognize and take into account that these tools employ a model the behavior of JavaScript functions. The illustrative embodiments recognize and take in account that by nature JavaScript is a dynamic and flexible programming language which support persistent side effects through DOM. Those embodiments also recognize and takes into account that JavaScript code is organized into extraction layers by popular line side frameworks. Additionally, the illustrative embodiments recognize and take into account that JavaScript is often bound to its enclosing its HTML context, referencing the universal resource locator (URL), input fields, and other parameters for purposes such as validation, redirection, content retrieval, and rendering. The illustrative embodiments recognize and take into account that JavaScript has features that can make generating an effective model of the behavior of JavaScript functions more difficult than desired.

The illustrative embodiments also recognize and take account that having a security tool that implements a learning-based technique utilizing crowd-sourced data can be advantageous. Further, the illustrative embodiments recognize and take into account that a security testing tool implementing feature analysis with this learning-based technique can be used to determine trending attack patterns. The illustrative embodiments also recognize and take into account that this type of security testing tool can operate dynamically to allow rate ranking of the payloads on a regular basis or continuously. The illustrative embodiments recognize and take into account that this type of ranking can be performed automatically without the need for human user input and that this type of analysis can be performed as a background process in a security testing tool.

Thus, the illustrative embodiments provide a method, apparatus, system, and computer program product for performing security testing. A computer system identifies payloads that are successful payloads using crowd-sourced data in which a successful payload is a payload in a successful attack. The computer system determines a set of popular payloads from the successful payloads using the crowd-sourced data. The computer system focuses testing on the set of popular payloads based on a set of key features of the set of popular payloads.

As used herein, a "set of" when used with reference to items means one or more items. For example, a set of popular payloads is one or more popular payloads.

With reference now to the figures and, in particular, with reference to FIG. 1, a pictorial representation of a network of data processing systems is depicted in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server computer 104 and server computer 106 connect to network 102 along with storage unit 108. In addition, client devices 110 connect to network 102. As depicted, client devices 110 include client computer 112, client computer 114, and client computer 116. Client devices 110 can be, for example, computers, workstations, or network computers. In the depicted example, server computer 104 provides information, such as boot files, operating system images, and applications to client devices 110. Further, client devices 110 can also include other types of client devices such as mobile phone 118, tablet computer 120, and smart glasses 122. In this illustrative example, server computer 104, server computer 106, storage unit 108, and client devices 110 are network devices that connect to network 102 in which network 102 is the communications media for these network devices. Some or all of client devices 110 may form an Internet of things (IoT) in which these physical devices can connect to network 102 and exchange information with each other over network 102.

Client devices 110 are clients to server computer 104 in this example. Network data processing system 100 may include additional server computers, client computers, and other devices not shown. Client devices 110 connect to network 102 utilizing at least one of wired, optical fiber, or wireless connections.

Program code located in network data processing system 100 can be stored on a computer-recordable storage medium and downloaded to a data processing system or other device for use. For example, program code can be stored on a computer-recordable storage medium on server computer 104 and downloaded to client devices 110 over network 102 for use on client devices 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational, and other computer systems that route data and messages. Of course, network data processing system 100 also may be implemented using a number of different types of networks. For example, network 102 can be comprised of at least one of the Internet, an intranet, a local area network (LAN), a metropolitan area network (MAN), or a wide area network (WAN). FIG. 1 is intended as an example, and not as an architectural limitation for the different illustrative embodiments.

As used herein, "a number of" when used with reference to items, means one or more items. For example, "a number of different types of networks" is one or more different types of networks.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

In this illustrative example, web application 130 runs in the browser 132 in client computer 112. As depicted, web application 130 can have vulnerabilities to one or more of payloads 134.

As depicted, security testing tool 136 is located in client computer 112. Security testing tool 136 enables more efficient testing of payloads 134 to determine vulnerabilities for web application 130 as compared to currently available security testing tools.

In this illustrative example, security testing tool 136 receives crowd-sourced data 138 from various sources in network data processing system 100. With crowd-sourced data 138, security testing tool 136 can derive the information about which ones of payloads 134 are successful payloads. Crowd-sourced data 138 can be obtained from various sources selected from at least one of as payload databases, blogs, forums, vulnerability databases, or other suitable sources.

As depicted, security testing tool 136 can place payloads 134 into an order based on the frequency at which payloads 134 are successful. In this illustrative example, a payload is considered to be successful if the payload successfully performs an attack. Crowd-sourced data is obtained from sources on the Internet or other networks. The crowd-sourced data can be obtained from blogs, forums, message boards, payload databases with success information from security testing tools, or other suitable collections of data in which different users or applications can contribute data about payloads. The crowd-sourced data can also include payloads that can be used to determine whether systems are vulnerable.

In this example, the crowd-sourced data can be used to prioritize payloads that are already deployed in rules used in security testing tools. The security testing tools can test payloads based on discussions by people about particular payloads or information about particular payloads submitted by applications, such as security testing tools, virus scanners, or other anti-virus or malware software. Payloads that are discussed or show up more in the crowd-sourced data can be ranked higher for testing for that period of time. As the discussion or other data about payloads changes, ranking of payloads for testing also changes. Thus, security testing tool 136 is adaptable to focus testing on payloads that are considered to be of higher concern or "trending".

For example, when a payload is discussed heavily by users or security testing tools show a greater frequency of success by a particular payload, that payload can be ranked with an assumption that the payload should be tested more quickly. Over time, that particular payload may no longer be ranked as high because actions or changes have been made to the software to decrease or eliminate the vulnerability to the payload. In the case that a payload is identified in which security testing tool 136 does not have rules to implement testing, security testing tool 136 can be modified with new rules to test the particular payload.

In this example, security testing tool 136 identifies popular payloads 140 and unpopular payloads 142 in payloads 134 as these payloads are received by client computer 112. These popular payloads can also be referred to as hot payloads. The unpopular payloads 142 in payloads 134 can also include unsuccessful payloads. In other words, the frequency of success of payloads 134 can be zero in this illustrative example.

As depicted, security testing tool 136 maps payloads 134 to features. The features describe payloads 134. These features can be considered a fingerprint distinguishes payloads 134 from each other. For example, the code in a payload may be used to determine the features. These features can take the form of tokens. For payloads, a token can be an atomic syntactic or grammatical element that is combined with other elements to form the payload. Categories of tokens can include a constant, an identifier, an operator, a separator, a reserved word, or other types of tokens. For example, "new" and "function=" are tokens in JavaScript. Tokens can include, for example, <iframe . . . >, </iframe>, src=, javascript:, alert( . . . ), and other types of tokens.

Further, security testing tool 136 can derive key features from the features map to payloads 134. The key features are a subset of the features and in this example are a minimum subset of the features that can distinguish popular payloads 140 from unpopular payloads 142 in payloads 134.

With the identification of the key features, security testing tool 136 can use the key features to focus testing on popular payloads 140. Further, security testing tool 136 can use the key features that determine popularity to highlight or identify a subset of payloads 134 as trending payloads that are to be given priority in testing. In other words, the selection of payloads 134 for testing can be performed using the set of key features to identify which ones of payloads 134 should be tested. With the set of key features, security testing tool 136 can identify payloads in addition to those that have been identified through crowd-sourced data. In other words, any payload that meets the set of key features can be selected for testing when security testing tool 136 uses the key features to focus testing on popular payloads 140. In other words, payloads in addition to popular payloads 140 can be selected for testing when security testing tool 136 uses the key features to select payloads for testing. Thus, payloads other than payloads 134 can be received and tested by security testing tool 136.

Further, security testing tool 136 can perform mining to identify payloads that match the key features from external sources, such as weakness enumeration (CWE) databases and other sources on network data processing system 100. Additionally, security testing tool 136 can also generate new payloads that meet the key features. These new payloads can be used by security testing tool 136 to test web application 130 for vulnerabilities.

With the use of crowd-sourced data 138, security testing tool 136 can more efficiently test web application 130 for vulnerabilities as compared to currently used techniques. Crowd-sourced data 138 enables security testing tool 136 to reduce the number of payloads 134 from all to a portion of payloads 134 that are used to test web application 130 for vulnerabilities.

Further, with the use of crowd-sourced data 138, security testing tool 136 operates as an intelligent testing tool that implements a learning-based technique that utilizes crowd-sourced data 138 to derive trends in attack patterns. This type of capability is dynamic and can result in ranking or changing over time which ones of payloads 134 should be focused on for use in testing web application 130.

The illustration of security testing tool 136 used to test payloads 134 for vulnerabilities in web application 130 is provided as one illustrative example and not meant to limit the manner in which other illustrative examples can be implemented. For example, security testing tool 136 can be located in other computing devices other than client computer 112. In one example, security testing tool 136 can be located in firewall, a router, a switch, server computer 104, or if some other computing device within network data processing system 100. As another example, security testing tool 136 can also operate to analyze payloads 134 to test vulnerabilities for other applications in addition to or in place of web application 130. These applications can include server-side applications as well as client-side applications. Applications can also include application running in appliances such as a firewall or router.

Figure 2:
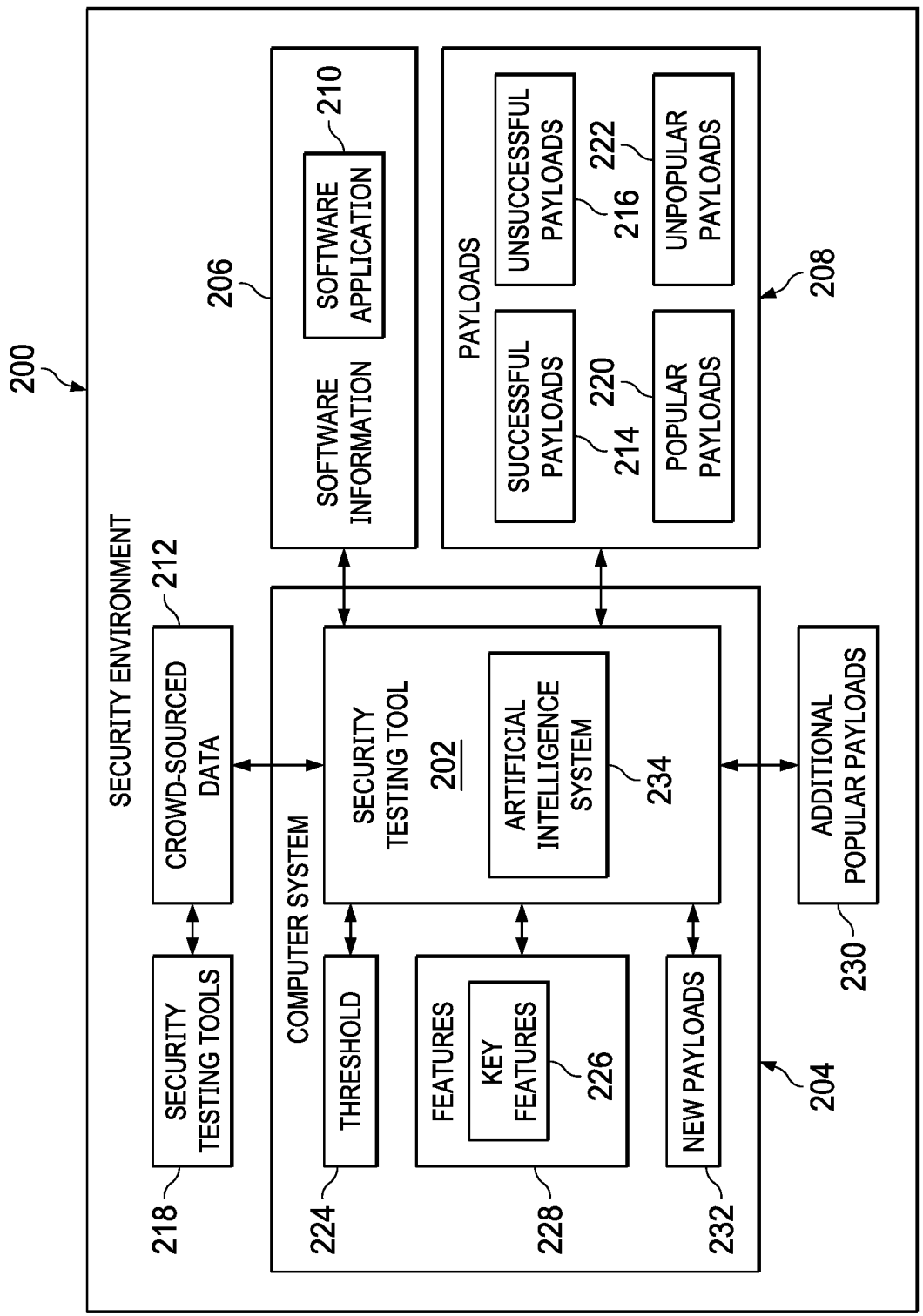
FIG. 2 is a block diagram of a security environment in accordance with an illustrative embodiment.

With reference now to FIG. 2, a block diagram of a security environment is depicted in accordance with an illustrative embodiment. In this illustrative example, security environment 200 includes components that can be implemented in hardware such as the hardware shown in network data processing system 100 in FIG. 1.

As depicted, security testing tool 202 in computer system 204 operates to test software information 206 for vulnerabilities to payloads 208. In this illustrative example, software information can take a number of different forms. For example, software information 206 can include at least one of a software application, a website, a framework, a server-side framework, a client-side framework, an applet, a browser, a mobile application, webpages, multimedia content, a web page, a document, an image, a graphic, or other types of software information.

Computer system 204 is a physical hardware system and includes one or more data processing systems. When more than one data processing system is present in computer system 204, those data processing systems are in communication with each other using a communications medium. The communications medium can be a network. The data processing systems can be selected from at least one of a computer, a server computer, a tablet computer, or some other suitable data processing system.

This testing can be performed on software information 206 to determine vulnerabilities of software information 206 to payloads 208. In this illustrative example, software information 206 includes software application 210. Software application 210 can have vulnerabilities to particular payloads in payloads 208 while other types of software applications may not have the same vulnerability.

As depicted, security testing tool 202 can operate to test payloads 208. In this depicted example, payloads 208 can be obtained from a number of different sources. For example, payloads 208 can be obtained from at least one of traffic on a network data processing system, software application 210, a firewall, a router, a database of payloads, or some other suitable source.

In testing software application 210 for vulnerabilities, security testing tool 202 can perform testing in a number of different ways. For example, the testing can be performed on online systems, copies of live systems, live software applications, copies of software applications running in a sandbox, software applications running on a test computer, or in other forms. In this illustrative example, security testing tool 202 employs intelligent learning techniques to focus testing on payloads 208. In other words, security testing tool 202 can focus testing on particular payloads in payloads 208 instead of testing all of the payloads in payloads 208. As depicted, this selection of payloads in payloads 208 is performed using crowd-sourced data 212.

Crowd-sourced data 212 can be used to determine information about the success of payloads 208. For example, crowd-sourced data 212 can be used to determine at least one of successful payloads 214 in payloads 208 or unsuccessful payloads 216 in payloads 208.

In this illustrative example, crowd-sourced data 212 can take a number of different forms. Crowd-sourced data 212 can be selected from at least one of success information for payloads 208 obtained from security testing tools 218, a payload database, a forum, a blog, a vulnerability database, a common weakness enumeration (CWE) database, a report from a manual audit, a vulnerability alert, or other types of crowd-sourced data that can be obtained from a network data processing system such as the Internet.

In this depicted example, success information for payloads 208 can be obtained from security testing tools 218 deployed within security environment 200. These security tools can communicate information about at least one of successful payloads 214 or unsuccessful payloads 216 to each other or to a centralized server. The manual audit information can be obtained from websites such as, for example, IBM X-Force Exchange. Security testing tools 218 can be security tools such as security testing tool 202. Additionally, security testing tools 218 can take other forms selected from at least one of a vulnerability scanning tool, security scanning tool, penetration testing tool, a dynamic security testing tool, a static security testing tool, or other types of security tools. An example of a dynamic security testing tool is AppScan enterprise, AppScan source, and AppScan standing, which are available from International Business Machines Corporation.

During operation of security testing tool 202, security testing tool 202 running in computer system 204 receives crowd-sourced data 212. Crowd-sourced data 212 can be received in response to requests made by security testing tool 202 or crowd-sourced data 212 can be pushed to security testing tool 202. Security testing tool 202 can receive crowd-sourced data 212 from security testing tools 218 running on a set of computing devices in a network data processing system.

As depicted, security testing tool 202 determines information about successful payloads in payloads 208 using crowd-sourced data 212. In this example, a successful payload is a payload that is used in a successful attack. For example, payload can be one that was actually run in results in at exploits, causes a vulnerability, or some combination thereof.

As depicted, security testing tool 202 operates to determine a set of popular payloads 220 from payloads 208 using crowd-sourced data 212. The set of popular payloads 220 is a subset of payloads 208 and in particular, the set of popular payloads 220 can be a subset of successful payloads 214. This determination can be performed in a number of different ways. In determining the set of popular payloads 220 from payloads 208, security testing tool 202 orders payloads 208 based on a frequency that payloads 208 are identified as successful payloads 214 in the crowd-sourced data 212 and divides the payloads 208 into the set of popular payloads 220 and the set of unpopular payloads 222.

In this illustrative example, security testing tool 202 can place or rank payloads in payloads 214 into an order according to the frequency at which the payloads 214 are reported as successful using crowd-sourced data 212. In this depicted example, payloads 208 that security testing tools 218 have available for testing or payloads 208 that have been tested by security testing tools 218 but have not been reported as successful are assigned a popularity level of zero.

For example, security testing tools can send reports to a centralized database or to each other. These reports identify what payloads have been tested and the results of the test. These results can include whether an attack was successful. The results can also include at least one of an identification of the software application tested, information about the hardware on which the software application is run, the damage caused by the payload, or other suitable information. Each of these reports can be analyzed to identify the frequency of success of the payloads that have been tested by each of the security testing tools. The frequencies for payloads can be identified from all the reports for the different payloads tested by the security testing tools. The frequencies can then be used to place the payloads into an order that reflects the frequency at which the payloads were identified as successful in the reports generated by the security testing tools.

The reports can also indicate payloads that the security testing tools identified but have not tested. Further, these reports can be anonymized to reduce identify information about vulnerable servers and protect privacy.

In another illustrative example, the impact of an attack can be used to order or rank payloads in addition to using frequency. Crowd-sourced data can be used to identify the impact an attack has. In this example, the impact can be the damage that the payloads can potentially cause. For example, common vulnerability and exposure (CVE) scores are examples of crowd-sourced data that can be obtained from databases showing the impact of an attack in addition to the frequency at which the attacks are seen.

In this illustrative example, security testing tool 202 partitions or divides payloads 214 into the set of popular payloads 220 and the set of unpopular payloads 222. The partition can be made by selecting threshold 224 for the popularity of payloads 208.

Threshold 224 can be selected in a number of different ways. For example, threshold 224 can be predetermined or dynamically selected. When threshold 224 is predetermined, threshold 224 can be based on based on a fixed popularity level, a proportion of the payloads, or some other suitable factors.

When threshold 224 is dynamic, threshold 224 can change over time. For example, threshold 224 can be based on a testing budget. With the example, the testing budget allocates a selected amount of computing resources for testing payloads 208. These computing resources can include at least one of processor resources, storage, bandwidth, or other types of computing resources. With the number of tests and options for the tests, all of the tests often cannot be completed within a reasonable amount of time with the computing resources available. These resources can change based on the need of the computing resources, other processes or operations at different points in time. Testing budget in the illustrative example enables focusing on a manageable number of payloads to perform testing.

Crowed-sourced data from the local network as well as the data from the third-party sources that identify the frequency of successful attacks or payloads can all be used. In addition, when data comes from an intranet (an internal local network,) that crowd-source data can be given a higher priority. In one example, an organization has x number of security testing tools deployed. If "n" security testing tools all of a sudden start reporting finding a particular vulnerability by a payload on some of the servers, then checking for the vulnerability to that payload should be performed by all of the other "x-n" security testing tools. The payload can be ranked or placed higher in the order of payloads. This type of ordering of payloads results in the payload identified by the "n" security testing tools having a higher priority for testing.

In this example, security testing tool 202 identifies features 228 of the set of popular payloads 220. Features 228 can include at least one of a number of tokens, a token, an overall payload length, a correlation between tokens, or other features that can be used to identify a payload. In the illustrative example, a token is an element in a programming language. For example, for payloads, a token can be an atomic syntactic or grammatical element that is combined with other elements to form the payload. Categories of tokens can include a constant, an identifier, an operator, a separator, a reserved word, or other types of tokens. For example, "new" and "function=" are tokens in JavaScript. Tokens can include, for example, <iframe . . . >, </iframe>, src=, javascript:, alert( . . . ), and other types of tokens.

Security testing tool 202 identifies a minimal subset of the features 228 that distinguishes the set of popular payloads 220 from the set of unpopular payloads 222 to form a set of key features 226. Security testing tool 202 focuses testing on the set of popular payloads 220 based on a set of key features 226 the set of popular payloads 220. Thus, in this illustrative example, the testing performed by security testing tool 202 is based on the set of key features 226 of popular payloads 220.

In one illustrative example, artificial intelligence system 234 in security testing tool 202 can perform the different steps in the process to identify the set of popular payloads 220 focusing testing on these payloads using crowd-sourced data 212. Artificial intelligence system 234 is a system that has intelligent behavior and can be based on function of the human brain. An artificial intelligence system comprises at least one of an artificial neural network, a cognitive system, a Bayesian network, a fuzzy logic, an expert system, a natural language system, a cognitive system, or some other suitable system. Machine learning is used to train the artificial intelligence system. Machine learning involves inputting data to the process and allowing the process to adjust and improve the function of the artificial intelligence system.

A cognitive system is a computing system that mimics the function of a human brain. The cognitive system can be, for example, IBM Watson available from International Business Machines Corporation.

In one illustrative example, the artificial intelligence system can search for and analyze crowd-sourced data. For example, the artificial intelligence system can search for discussions of attacks using payloads and identifies frequency of payloads being discussed in various forms. These forms can include discussions in forums, message boards, email messages, frequency data in payload databases, or other sources. The artificial intelligence system can analyze this information to determine a frequency of success for payloads for use in ordering the payloads. In this manner, the artificial intelligence system can obtain data in different forms and from different sources and determine a frequency for use in ordering the payloads.

In another example, the artificial intelligence system can use frequency information as a baseline of what is considered to be popular for payloads. The artificial intelligence system can then develop a profile to analyze discussions about payloads in crowd-sourced data and determine which discussions are considered to be popular about payloads for use in determining the frequency of the success of payloads. For example, the artificial intelligence system can assign a frequency to a discussion about a payload. This frequency for the payload can then be used with other crowd-source data that actually identifies a frequency of successful attacks for the payload.

Further, with the identification of the set of key features 226, security testing tool 202 can identify additional popular payloads 230 by mining on a network such as the Internet, a local area network, an intranet, or other type of network. For example, security testing tool 202 can search a network data processing system for payloads that match the set of key features 226 to identify additional popular payloads 230. These additional popular payloads can be tested to determine whether vulnerabilities are present in software application 210.

As another example, security testing tool 202 can perform payload generation by creating new payloads 232 that have the set of key features 226. These new payloads can also be used in testing software applications to determine whether vulnerabilities are present. New payloads 232 can be used to detect zero-day attacks that are based on variations on payloads already present in for existing attacks. At least one of identifying additional popular payloads 230 or generating new payloads 232 can be performed using artificial intelligence system 234.

As depicted, security testing tool 202 can be implemented in software, hardware, firmware or a combination thereof. When software is used, the operations performed by security testing tool 202 can be implemented in program code configured to run on hardware, such as a processor unit. When firmware is used, the operations performed by security testing tool 202 can be implemented in program code and data and stored in persistent memory to run on a processor unit. When hardware is employed, the hardware may include circuits that operate to perform the operations in security testing tool 202.

In the illustrative examples, the hardware may take a form selected from at least one of a circuit system, an integrated circuit, an application specific integrated circuit (ASIC), a programmable logic device, or some other suitable type of hardware configured to perform a number of operations. With a programmable logic device, the device can be configured to perform a number of operations. The device can be reconfigured at a later time or can be permanently configured to perform a number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

In one illustrative example, one or more technical solutions are present that overcome a technical problem with testing payloads to determine applications vulnerable to payloads in a manner that reduces the amount of resources needed for testing. As a result, one or more technical solutions can provide a technical effect in which payloads that are more likely to be an issue can be identified and selected for testing. One or more technical solutions can provide a technical effect that reduces the number of payloads that are used to test software. In the illustrative example, the process can be run as a background process to collect crowd-sourced data, identify popular payloads, or identify a set of key features that identify the popular payloads. With the identification of the set of key features, security testing tools can be configured to test payloads that meet the set of key features. In this manner, one or more technical solutions enable dynamically adapting security testing tools to focus testing on payloads that currently have a higher concern using the crowd-sourced data. As the crowd-source data indicates a change in what payloads are of concern, security testing tools implementing this process use the set of key features to focus testing on the payloads identified using the crowd-sourced data.

Computer system 204 can be configured to perform at least one of the steps, operations, or actions described in the different illustrative examples using software, hardware, firmware or a combination thereof. As a result, computer system 204 operates as a special purpose computer system in which security testing tool 202 in computer system 204 enables identifying payloads that are more likely to be successful in the attacks using crowd-sourced data 212. In particular, security testing tool 202 transforms computer system 204 into a special purpose computer system as compared to currently available general computer systems that do not have security testing tool 202.

The illustration of security environment 200 in FIG. 2 is not meant to imply physical or architectural limitations to the manner in which an illustrative embodiment can be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, security testing tool 202 does not need to order all of payloads 208. For example, security testing tool 202 can place successful payloads 214 in payloads 208 into an order based on frequency of success in attacks and divide payloads 208 into a set of popular payloads 220 and a set of unpopular payloads 222. As another example, artificial intelligence system 234 can be a separate component from security testing tool 202.

Figure 3:
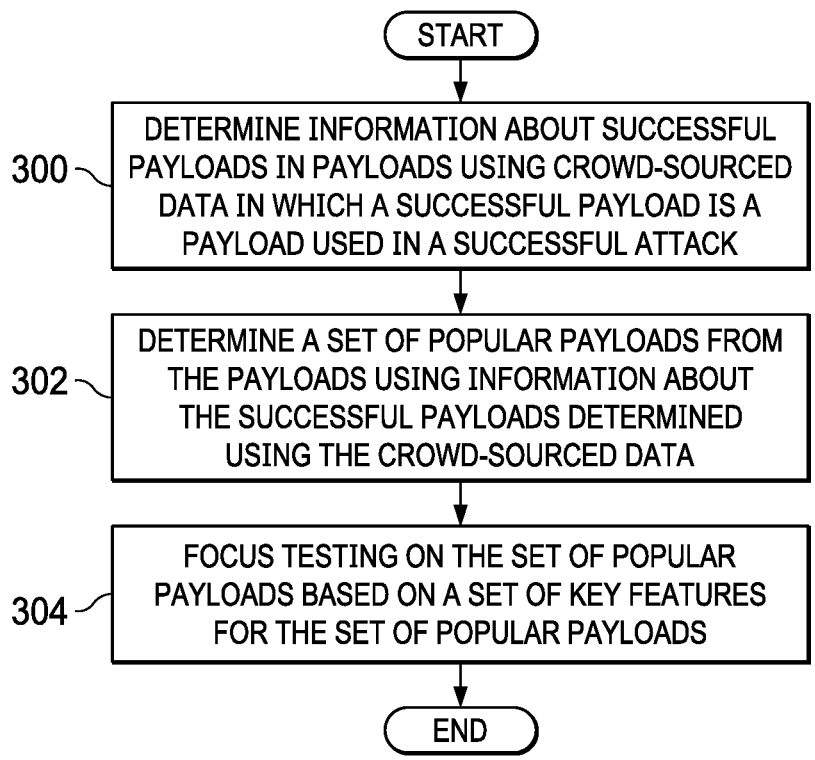
FIG. 3 is a flowchart of a process for security testing in accordance with an illustrative embodiment.

Turning next to FIG. 3, a flowchart of a process for security testing is depicted in accordance with an illustrative embodiment. The process in FIG. 3 can be implemented in hardware, software, or both. When implemented in software, the process can take the form of program code that is run by one or more processor units located in one or more hardware devices in one or more computer systems. For example, the process can be implemented in security testing tool 202 in computer system 204 in FIG. 2. This process can be a background process that is run continuously while security testing tool 202 performs other tasks.

The process begins by determining information about successful payloads in payloads using crowd-sourced data in which a successful payload is a payload used in a successful attack (step 300). The process determines a set of popular payloads from the payloads using information about the successful payloads determined using the crowd-sourced data (step 302). The process focuses testing on the set of popular payloads based on a set of key features for the set of popular payloads (step 304). The process terminates thereafter.

The process in FIG. 3 can be repeated any number of times to take into account changes in which payloads are identified as successful in the crowd-sourced data and the occurrence of new payloads. In this manner, the process can learn as payloads become more successful in attacks. The change in success can occur as a result of new payloads being used in attacks or changes in software that present new vulnerabilities.

Figure 4:
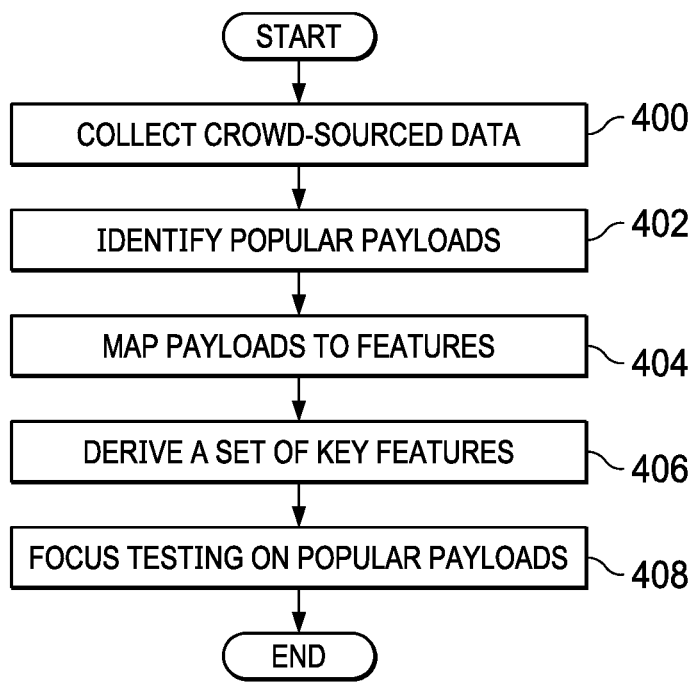
FIG. 4 is a flowchart of a process for focusing testing of payloads in accordance with an illustrative embodiment.

With reference next to FIG. 4, a flowchart of a process for focusing testing of payloads is depicted in accordance with an illustrative embodiment. The process in FIG. 4 can be implemented in hardware, software, or both. When implemented in software, the process can take the form of program code that is run by one or more processor units located in one or more hardware devices in one or more computer systems. For example, the process can be implemented in security testing tool 202 in computer system 204 in FIG. 2. The process can be used to rank payloads in a time-sensitive fashion. This process can be a background process that is run continuously while security testing tool 202 performs other tasks. Further, one or more of the different steps in this flowchart can be performed using artificial intelligence system 234 in security testing tool 202 in FIG. 2.

The process begins by collecting crowd-sourced data (step 400). The process identifies popular payloads (step 402). The popular payloads can be determined based on the frequency at which payloads are successful in attacks as identified using collecting crowd-sourced data. The other payloads are unpopular payloads.

The process maps payloads to features (step 404). In step 404, features for popular and unpopular payloads are mapped. The process derives a set of key features (step 406). The set of key features are a smallest subset of the features that distinguishes the popular payloads from the unpopular payloads.

The process focuses testing on popular payloads (step 408). The process terminates thereafter. The process in this flowchart can be performed continuously such that the focus for testing can change as payloads that are successful change as determined using the crowd-sourced data. In this manner, the process can focus on trending payloads in the crowd-sourced data to more efficiently test payloads for vulnerabilities in software.

The processes in FIG. 3 and FIG. 4 can be implemented as program code that is run for processes in security testing tool 202. Although not required, these processes can also include or communicate with an artificial intelligence system. The use of an artificial intelligence system can increase the speed and accuracy of which payloads are identified using crowd-sourced data from different sources. For example, artificial intelligence systems can be used to identify frequencies of successful attacks by payloads from analyzing discussions forums, message boards, chats, email messages, and other sources. These frequencies determined by artificial intelligence systems can be used with other crowd-sourced data that include actual indications of the success in attacks, such as data from a common vulnerability scoring system (CVSS) database or data received identifying successful attacks from other security testing tools.

Figure 5:
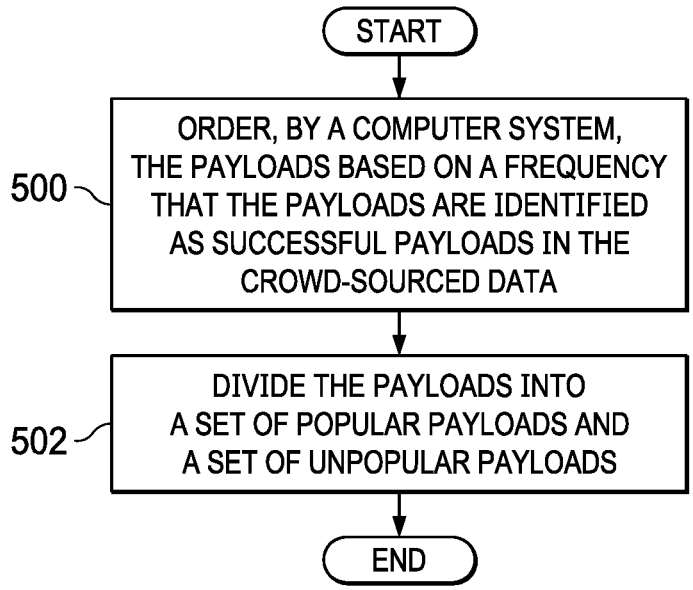
FIG. 5 is a flowchart of a process for determining a set of popular payloads in accordance with an illustrative embodiment.

With reference next to FIG. 5, a flowchart of a process for determining a set of popular payloads is depicted in accordance with an illustrative embodiment. The process in FIG. 5 is an example of one implementation for step 302 in FIG. 3 and for step 404 in FIG. 4.

The process begins by ordering, by a computer system, the payloads based on a frequency that the payloads are identified as successful payloads in the crowd-sourced data (step 500). The process divides the payloads into a set of popular payloads and a set of unpopular payloads (step 502). The process terminates thereafter. In step 302, a threshold for the frequency can be used to determine the frequency at which payloads divided or partitioned into popular payloads and unpopular payloads.

Figure 6:
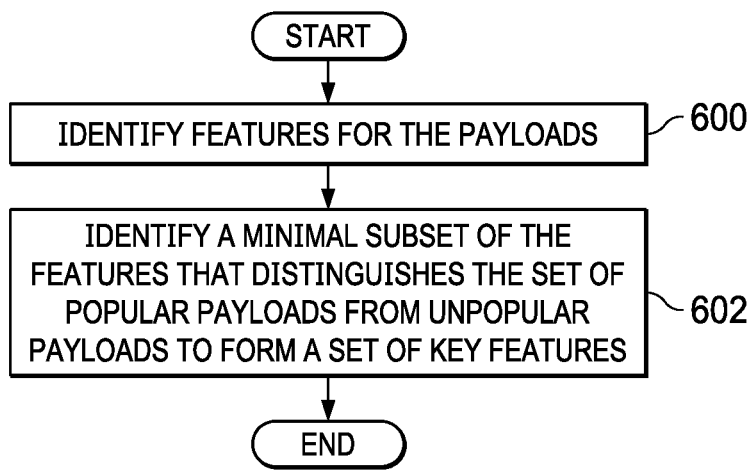
FIG. 6 is a flowchart of a process for identifying key features in accordance with an illustrative embodiment.

Turning to FIG. 6, a flowchart of a process for identifying key features is depicted in accordance with an illustrative embodiment. The process in FIG. 6 can be implemented in hardware, software, or both. When implemented in software, the process can take the form of program code that is run by one of more processor units located in one or more hardware devices in one or more computer systems. For example, the process can be implemented in security testing tool 202 in computer system 204 in FIG. 2. The process can identify the set of key features used in step 304 in FIG. 3.

The process begins by identifying features for the payloads (step 600). In step 600, the features can include at least one of a number of tokens, a token, an overall payload length, a correlation between tokens, or other suitable features. The process identifies a minimal subset of the features that distinguish the set of popular payloads from unpopular payloads to form a set of key features (step 602). The process terminates thereafter. Step 602 can be performed using an artificial intelligence system that implements Waikato Environment of Knowledge Analysis (Weka) to identify the minimum subset of key features. Weka performs data analysis and predictive modeling.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks can be implemented as program code, hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams can be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession can be performed substantially concurrently, or the blocks may sometimes be performed in the reverse order, depending upon the functionality involved. Also, other blocks can be added in addition to the illustrated blocks in a flowchart or block diagram.

Figure 7:
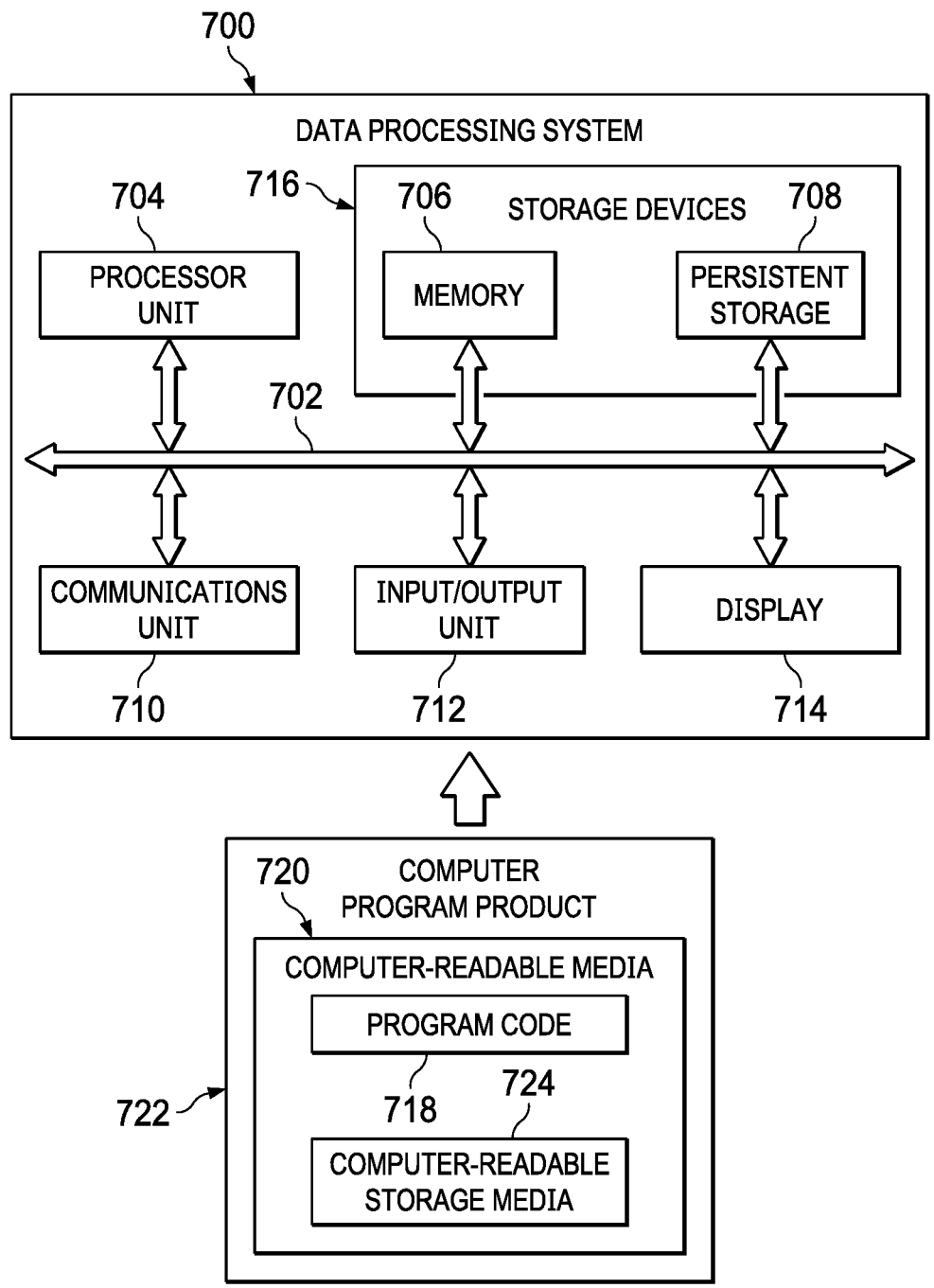
FIG. 7 is a block diagram of a data processing system in accordance with an illustrative embodiment.

Turning now to FIG. 7, a block diagram of a data processing system is depicted in accordance with an illustrative embodiment. Data processing system 700 can be used to implement server computer 104, server computer 106, client devices 110, in FIG. 1. Data processing system 700 can also be used to implement computer system 204 in FIG. 2. In this illustrative example, data processing system 700 includes communications framework 702, which provides communications between processor unit 704, memory 706, persistent storage 708, communications unit 710, input/output (I/O) unit 712, and display 714. In this example, communications framework 702 takes the form of a bus system.

Processor unit 704 serves to process instructions for software that can be loaded into memory 706. Processor unit 704 includes one or more processors. For example, processor unit 704 can be selected from at least one of a multicore processor, a central processing unit (CPU), a graphics processing unit (GPU), a physics processing unit (PPU), a digital signal processor (DSP), a network processor, or some other suitable type of processor.

Memory 706 and persistent storage 708 are examples of storage devices 716. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 716 may also be referred to as computer-readable storage devices in these illustrative examples. Memory 706, in these examples, can be, for example, a random-access memory or any other suitable volatile or non-volatile storage device. Persistent storage 708 may take various forms, depending on the particular implementation.

For example, persistent storage 708 may contain one or more components or devices. For example, persistent storage 708 can be a hard drive, a solid-state drive (SSD), a flash memory, a rewritable optical disk, a rewritable magnetic tape, or some combination of the above. The media used by persistent storage 708 also can be removable. For example, a removable hard drive can be used for persistent storage 708.

Communications unit 710, in these illustrative examples, provides for communications with other data processing systems or devices. In these illustrative examples, communications unit 710 is a network interface card.

Input/output unit 712 allows for input and output of data with other devices that can be connected to data processing system 700. For example, input/output unit 712 may provide a connection for user input through at least one of a keyboard, a mouse, or some other suitable input device. Further, input/output unit 712 may send output to a printer. Display 714 provides a mechanism to display information to a user.

Instructions for at least one of the operating system, applications, or programs can be located in storage devices 716, which are in communication with processor unit 704 through communications framework 702. The processes of the different embodiments can be performed by processor unit 704 using computer-implemented instructions, which may be located in a memory, such as memory 706.

These instructions are referred to as program code, computer usable program code, or computer-readable program code that can be read and run by a processor in processor unit 704. The program code in the different embodiments can be embodied on different physical or computer-readable storage media, such as memory 706 or persistent storage 708.

Program code 718 is located in a functional form on computer-readable media 720 that is selectively removable and can be loaded onto or transferred to data processing system 700 for processing by processor unit 704. Program code 718 and computer-readable media 720 form computer program product 722 in these illustrative examples. In the illustrative example, computer-readable media 720 is computer-readable storage media 724.

In these illustrative examples, computer-readable storage media 724 is a physical or tangible storage device used to store program code 718 rather than a medium that propagates or transmits program code 718.

Alternatively, program code 718 can be transferred to data processing system 700 using a computer-readable signal media. The computer-readable signal media can be, for example, a propagated data signal containing program code 718. For example, the computer-readable signal media can be at least one of an electromagnetic signal, an optical signal, or any other suitable type of signal. These signals can be transmitted over connections, such as wireless connections, optical fiber cable, coaxial cable, a wire, or any other suitable type of connection.

The different components illustrated for data processing system 700 are not meant to provide architectural limitations to the manner in which different embodiments can be implemented. In some illustrative examples, one or more of the components may be incorporated in or otherwise form a portion of, another component. For example, memory 706, or portions thereof, may be incorporated in processor unit 704 in some illustrative examples. The different illustrative embodiments can be implemented in a data processing system including components in addition to or in place of those illustrated for data processing system 700. Other components shown in FIG. 7 can be varied from the illustrative examples shown. The different embodiments can be implemented using any hardware device or system capable of running program code 718.

Thus, illustrative embodiments provide a computer implemented method, computer system, and computer program product for security testing. Information about successful payloads in payloads is determined by a computer system using crowd-sourced data in which a successful payload is a payload used in a successful attack. A set of popular payloads is determined by a computer system from the payloads using information about the successful payloads determined using the crowd-sourced data. Testing is focused by the computer system on the set of popular payloads based on a set of key features for the set of popular payloads.

One or more illustrative examples are present that overcome a technical problem with testing payloads to determine and applications vulnerable to payloads in a manner that reduces the amount of resources needed for testing. As a result, one or more illustrative examples can provide a technical effect in which payloads that are more likely to be an issue can be identified and selected for testing. One or more illustrative examples can provide a technical effect that reduce the number of payloads that are used to test software. The illustrative examples can focus testing on payloads that are considered to be trending or considered to be more successful in attacks at a particular point in time. Thus, the processes in the illustrative examples can run continuously to collect and analyze crowd-sourced data such that security testing tools automatically expand and change the focus on payloads that are tested. The changes can be caused by changes in at least one of software or hardware used in computing environments. As different technologies are "trending," the vulnerabilities of those trending technologies to trending payloads may be identified and tested by security testing tools as described in the different illustrative example.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

What is claimed is:

1. A method for security testing, the method comprising:
 determining, by a computer system, information about successful payloads in payloads using crowd-sourced data in which a successful payload is a payload used in a successful attack;

determining, by the computer system, a set of popular payloads from the payloads using information about the successful payloads determined using the crowd-sourced data;

focusing, by the computer system, testing on the set of popular payloads based on a set of key features of the set of popular payloads; and receiving, by the computer system, the crowd-sourced data from security testing tools running on a set of computing devices in a network data processing system, wherein the crowd-sourced data comprises at least one report that identifies payloads that have been tested and the results of such testing, wherein determining, by a computer system, the set of popular payloads from the payloads comprises:

ordering, by the computer system, the payloads based on a frequency that the payloads are identified as successful payloads in the crowd-sourced data; and dividing, by the computer system, the payloads into the set of popular payloads and a set of unpopular payloads using a dynamic threshold that changes over time.

2. The method of claim 1 further comprising:

identifying, by the computer system, features for the payloads; and identifying, by the computer system, a minimal subset of the features that distinguishes the set of popular payloads from the set of unpopular payloads to form the set of key features.

3. The method of claim 2, wherein the features include at least one of a number of tokens, a token, an overall payload length, or a correlation between tokens, and wherein the crowd-sourced data is used to prioritize payloads that are already deployed in rules used by the computer system.

4. The method of claim 1 further comprising:

searching, by the computer system, a network data processing system for payloads that match the set of key features to identify additional popular payloads.

5. The method of claim 1 further comprising:

creating, by the computer system, new payloads having the set of key features of the set of popular payloads.

6. A security system comprising:

a computer system comprising at least one computers; and a security testing tool running in the computer system, wherein the security testing tool determines information about successful payloads in payloads using crowd-sourced data in which a successful payload is a payload used in a successful attack; determines a set of popular payloads from the payloads using information about the successful payloads determined from the crowd-sourced data; and focuses testing on the set of popular payloads based on a set of key features for the set of popular payloads, wherein the crowd-sourced data is used to prioritize payloads that are already deployed in rules used by the security testing tool, wherein the security testing tool receives the crowd-sourced data from security testing tools running on a set of computing devices in a network data processing system, wherein the crowd-sourced data comprises at least one report that identifies payloads that have been tested and the results of such testing, wherein in determining the set of popular payloads from the payloads, the security testing tool orders the payloads based on a frequency the payloads are identified as successful payloads in the crowd-sourced data and divides the payloads into the set of popular payloads and a set of unpopular payloads using a dynamic threshold that changes over time.

7. The security system of claim 6, wherein the security testing tool identifies features for the payloads and identifies a minimal subset of the features that distinguishes the set of popular payloads from the set of unpopular payloads to form the set of key features.

8. The security system of claim 7, wherein the features include at least one of a number of tokens, a token, an overall payload length, or a correlation between tokens, and wherein the crowd-sourced data is used to prioritize payloads that are already deployed in rules used by the computer system.

9. The security system of claim 6, wherein the security testing tool searches a network data processing system for payloads that match the set of key features to identify additional popular payloads.

10. The security system of claim 6, wherein the security testing tool creates new payloads having the set of key features of the set of popular payloads.

11. A computer program product embodied in a non-transitory computer-readable storage medium for security testing comprising:

the computer-readable storage media;

first program code, stored on the computer-readable storage media, for determining information about successful payloads in payloads using crowd-sourced data in which a successful payload is a payload used in a successful attack;

second program code, stored on the computer-readable storage media, for determining a set of popular payloads from the payloads using information about the successful payloads determined using the crowd-sourced data;

third program code, stored on the computer-readable storage media, for focusing testing on the set of popular payloads based on a set of key features for the set of popular payloads; and fourth program code, stored on the computer-readable storage media, for receiving the crowd-sourced data from security testing tools running on a set of computing devices in a network data processing system, wherein the crowd-sourced data comprises at least one report that identifies payloads that have been tested and the results of such testing, wherein the second program code comprises:

program code, stored on the computer-readable storage media, for ordering the payloads based on a frequency that the payloads are identified as successful payloads in the crowd-sourced data; and program code, stored on the computer-readable storage media, for dividing the payloads into the set of popular payloads and a set of unpopular payloads using a dynamic threshold that changes over time.

12. The computer program product of claim 11 further comprising:

fourth program code, stored on the computer-readable storage media, for identifying features for the payloads; and fifth program code, stored on the computer-readable storage media, for identifying a minimal subset of the features that distinguishes the set of popular payloads from the set of unpopular payloads to form the set of key features.

13. The computer program product of claim 11 further comprising:

fourth program code, stored on the computer-readable storage media, for searching a network data processing system for payloads that match the set of key features to identify additional popular payloads.

14. The computer program product of claim 11 further comprising:

fourth program code, stored on the computer-readable storage media, for creating new payloads having the set of key features of the set of popular payloads.

* * * * *